United States Patent [19]
Tamm

[11] Patent Number: 4,909,481
[45] Date of Patent: Mar. 20, 1990

[54] WIRE PULLING GUIDE

[76] Inventor: Carl R. Tamm, Rte. 2, Box 241, Jonesborough, Tenn. 37659

[21] Appl. No.: 167,097

[22] Filed: Mar. 11, 1988

Related U.S. Application Data

[63] Continuation-in-part of Ser. No. 93,028, Sep. 4, 1987, abandoned, which is a continuation-in-part of Ser. No. 12,564, Feb. 9, 1987, abandoned, which is a continuation-in-part of Ser. No. 869,223, Jun. 2, 1986, abandoned.

[51] Int. Cl.[4] ............................................. B66D 1/36
[52] U.S. Cl. ............................................. 254/134.3 R
[58] Field of Search ................................ 254/388–417, 254/134.3 R, 134.3 FT, 134.3 PA

[56] References Cited

U.S. PATENT DOCUMENTS

| | | | |
|---|---|---|---|
| 471,251 | 3/1892 | Frost | 254/409 |
| 1,053,268 | 2/1913 | Blodgett | 254/388 |
| 1,422,263 | 7/1922 | Haskel | 254/409 |
| 1,514,612 | 11/1924 | Glasgow | 254/134.3 R |
| 1,567,694 | 12/1925 | Amkin | 254/412 |
| 1,735,301 | 11/1929 | Short | 254/134.3 R |
| 1,761,003 | 6/1930 | Womrath | 254/390 |
| 2,453,963 | 11/1948 | Bercaw | 254/402 |
| 2,629,768 | 2/1953 | Beil | 254/134.3 R |
| 2,901,218 | 8/1959 | Scott | 254/409 |
| 3,020,332 | 2/1962 | Appleton | 254/134.3 R |
| 3,944,184 | 3/1976 | Fisch | 254/134.3 R |
| 4,541,615 | 9/1985 | King | 254/390 |

FOREIGN PATENT DOCUMENTS 670158 4/1952 United Kingdom ......... 254/134.3 R Primary Examiner—Robert C. Watson

[57] ABSTRACT

A wire pulling guide for use with an electrical conduit elbow having opposed side walls, opposed end walls and a floor, the walls and floor forming a generally rectangular elbow cavity, and a plurality of connector apertures in the elbow communicating with the cavity, the guide comprising a body having a base, support means extending upwardly therefrom, roller means on the support means, and clamp means on the support means, the body being adapted for positioning in the elbow cavity with the working surface of the roller aligned with a connector aperture, and with portions of the elbow in contact with the clamp means.

14 Claims, 4 Drawing Sheets

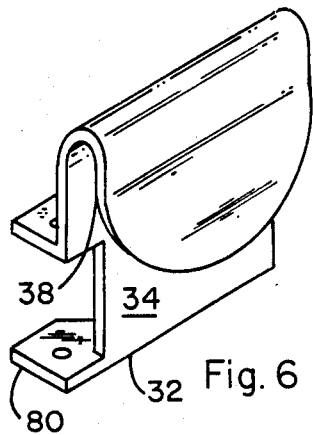
Fig. 6
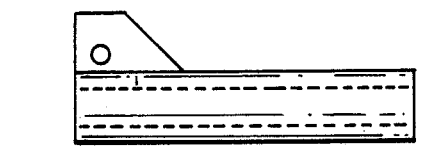
Fig. 7
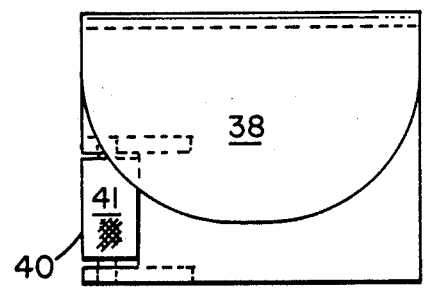
Fig. 8
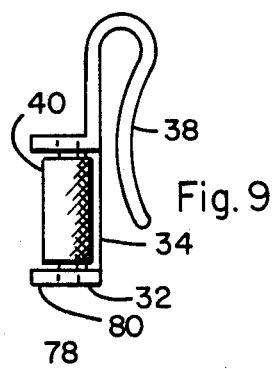
Fig. 9
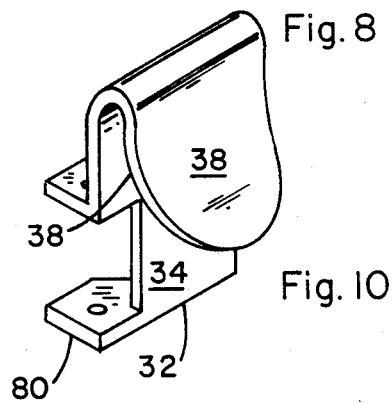
Fig. 10
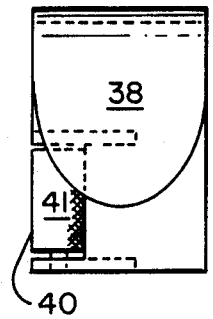
Fig. 11
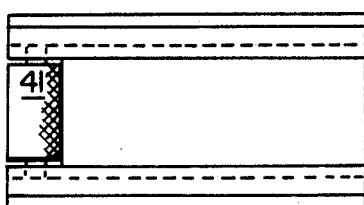
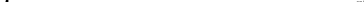
Fig. 13
Fig. 12

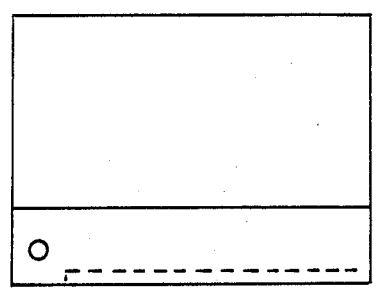
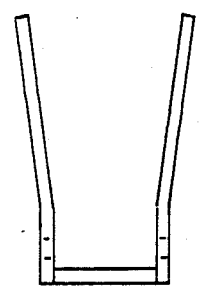
Fig. 14  Fig. 15
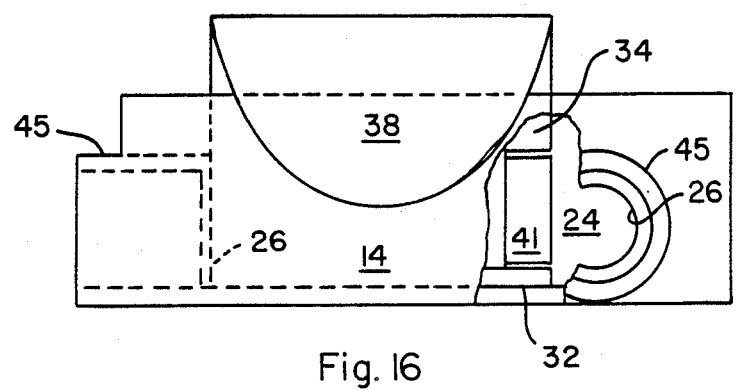
Fig. 16
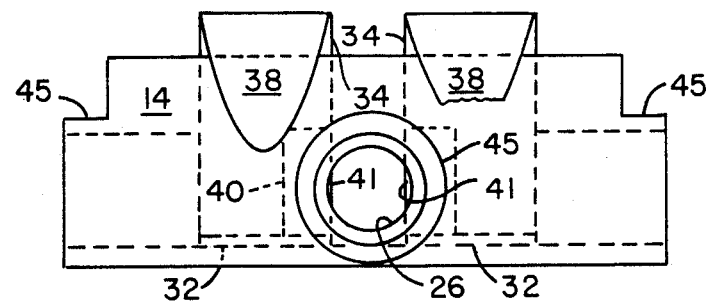
Fig. 17

WIRE PULLING GUIDE

This application is a continuation-in-part of applicant's copending Ser. No. 093,028 filed 9-4-87, now abandoned, which is a continuation-in-part of applicant's Ser. No. 012,564 filed 2-9-87 entitled "Wire Pulling Guide", now abandoned, which is a continuation-in-part of Ser. No. 869,223, filed 6-2-86, entitled "Wire Pulling Attachment", now abandoned, and concerns wire pulling guides or wire pull facilitating devices, and particularly those which are designed to assist in the pulling of wire such as insulated electrical wires around a right angle bend, either horizontally or vertically, such as required in the use of electrical conduit access elbow or "LB", "LR", "LL", or "TEE" fittings.

The use of various devices for assisting the pulling of wires is shown in such prior patents as: U.S. Pat. Nos. 2,746,715; 3,020,332; 3,994,184; 1,514,612; 2,629,768; 2,727,721; and 4,541,615. The devices of these patents, however, are not suitable for performing the task of properly guiding the wire in any of the aforesaid fittings, nor do they offer the convenience of operation provided by the present invention which is defined in its broad sense as:

A wire pulling guide for use with an electrical conduit access elbow having opposed side walls, opposed end walls and a floor, said walls and floor forming a generally rectangular elbow cavity, and a plurality of connector apertures in said elbow communicating with said cavity, said guide comprising a body having a base, support means extending upwardly therefrom, roller means on said support means, and clamp means on said body, said body being adapted for positioning in said elbow cavity with the working surface of said roller means aligned with a connector aperture, and with portions of said side walls of said elbow in contact with said clamp means for maintaining the operative position of said guide in said elbow cavity.

This broad definition is applicable to all of the embodiments shown in FIGS. 1–15. A more specific embodiment is shown in FIGS. 1–5 and is defined as:

A wire pulling guide for use with an electrical conduit access elbow having opposed side walls, opposed end walls and a floor, said walls and floor forming a generally rectangular elbow cavity, a first connector aperture through said floor adjacent one end thereof, and a second connector aperture through the end wall adjacent the other end of said floor, said guide comprising a body having a generally rectangular base and support means extending upwardly from each long edge thereof forming a channel therewith, clamp means on at least one of said support means, and roller means mounted in said channel adjacent one end thereof and having its working surface extending beyond said base, said body being adapted for positioning in said elbow cavity with said working surface of said roller means aligned with said first connector aperture, and with portions of at least one of said side walls of said elbow in contact with said clamp means.

The term "generally rectangular" as used above includes the elbow shown in the drawings wherein portions of the ends are curved and the elbow cavity is not a perfect rectangle. Preferred embodiments of the invention are where:

the base of the guide is adapted to rest firmly on the elbow floor;

each of the clamp means comprises a downwardly extending grip member which is integrally, resiliently connected to an upper portion of its associated support means, to provide therewith an inverted "U" shape cavity for frictionally receiving a side wall of the elbow;

each of the clamp means comprises one or more gripping teeth on the upper outer surface of each of said support means, wherein at least one of said support means is flexible in a lateral direction such that the upper portions of said support means can be flexibly compressed toward each other;

each grip member is shaped to provide an intermediate compression contact surface, and the leading edge of each grip member is out-turned to facilitate assembly of the guide to the elbow with the contact surfaces compressed against the elbow walls;

a stop is provided on the guide to prevent relative linear motion between the guide and the elbow during operation;

the stop comprises an adjustable slide and thumbscrew mechanism; and the stop mechanism is mounted on the inner surface of one or both of the support means.

The invention will be further understood from the following description and drawings wherein:

FIG. 6 is an isometric view of a side pull embodiment of the guide;

FIG. 7 is a top view of the guide of FIG. 6;

FIG. 8 is a side view of the guide of FIG. 6;

FIG. 9 is an end view of the guide of FIG. 6;

FIG. 10 is an isometric view of a shortened side pull embodiment of the guide;

FIG. 11 is a side view of the guide of FIG. 10;

FIG. 12 is an isometric view of a variation of the guide shown in FIGS. 4 and 5;

FIG. 13 is a top view of the guide of FIG. 12;

FIG. 14 is a side view of the guide of FIG. 12;

FIG. 15 is an end view of the guide of FIG. 12;

FIG. 16 is a side view, partly in section of a horizontal bend, end porting elbow, commonly referred to as an "LL", and the mirrored version commonly known as "LR", with the guide of FIGS. 6–9 in place, and FIG. 17 is a side view of a horizontal bend, mid porting elbow commonly referred to as a "TEE".

Figure 1:
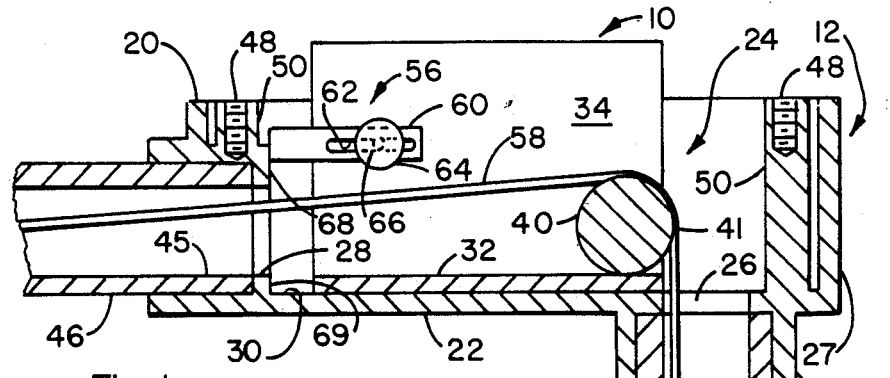
FIG. 1 is a longitudinal cross-sectional view of an "LB" fitting with the present wire pulling guide in operative position therein.
Figure 2:
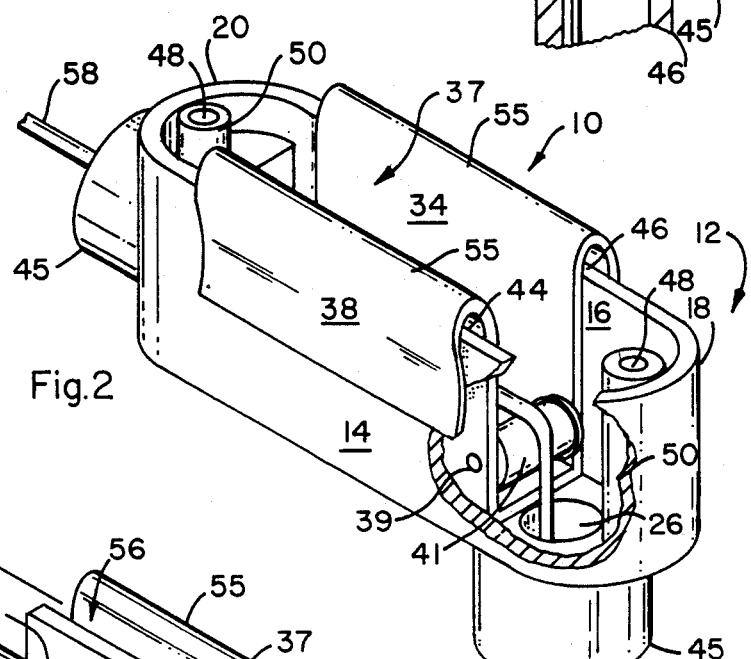
FIG. 2 is an isometric view, partially in section, of the fitting and guide of FIG. 1, without the stop means.
Figure 3:
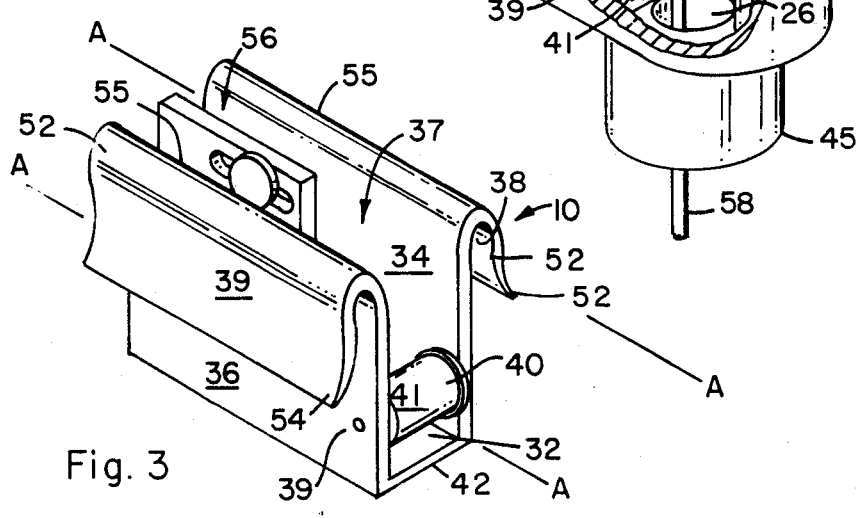
FIG. 3 is an isometric view of the guide of FIG. 1.

Referring to the drawings, particularly FIGS. 1–3, and with reference to claim 1 hereof, a wire pulling guide generally designated 10 of cast aluminum, steel, ceramic or other strong material such as PVC, cellulose ester, polyurethane, polyamide or cured unsaturated polyester, is shown for use with an electrical conduit access elbow generally designated 12 having opposed side walls 14 and 16, opposed end walls 18 and 20 and a floor 22, said walls and floor forming a generally rectangular elbow cavity generally designated 24, a first connector aperture 26 through said floor adjacent one end 27 thereof, and a second connector aperture 28 through the end wall 20 adjacent the other end 30 of said floor, said guide 10 comprising a body having a generally rectangular base 32 and support means 34 and 36 extending upwardly from each long edge thereof forming a channel therewith generally designated 37, clamp means 38 on each of said support means 34 and 36, or said base 32 providing said clamp means in cooperation with floor 22, and roller means 40 of nylon, steel, brass, or the like mounted in said channel 37 adjacent one end thereof on shaft 39 journaled in supports 34 and 36 and having its working surface 41 extending beyond the end 42 of said base 32, said body being adapted for positioning in said elbow cavity 24 with said working surface 41 of said roller means aligned with said first connector aperture 26, and with portions 44 and 46 respectively of said side walls 14 and 16 of said elbow positioned within said clamp means 38, and/or with said base 32 resting on said floor 22 whereby wire being pulled across roller 40 will clamp the guide in operative position in the elbow cavity by forcing base 32 against floor 22.

The elbow 12 is a conventional "LB" fitting, typically of any of the materials listed above for the guide. The elbow is conventionally formed with bushings such as 45 for receiving and connecting onto electrical conduits 46 in known manner. Threaded screw apertures such as 48 are typically provided in studs 50 for attachment of a cover or access plate to the elbow in known manner, the use of which constitutes no part of the present invention nor limits it in any way.

In the embodiment of the clamp means 38 shown in FIGS. 1-3 of the drawings, the clamp means comprise downwardly extending grip members 52 which are out-turned along their leading edges 54 and in-turned along intermediate lines A—A to give compression points for gripping of the elbow walls, the out-turned leading edges facilitating assembly of the clamp means over the elbow walls. It is apparent that the support means 34 and 36 and/or the grip members 52 may comprise two or more spaced segments rather than continuous structures provided a suitable clamping force is maintained. It is particularly noted that the present invention allows the clamping force to be varied by varying the thickness and flexibility of the web portions 55 which connect the supports 34 and 36 to their respective clamp means 38. In this regard, the web portions 55 may be altered in construction such as to utilize spring hinge type mechanisms known to the art to provide the necessary clamping force. The clamping force should be such that the guide is not easily moved once it has been forced down into the elbow cavity.

In one embodiment of the present invention, a stop means generally designated 56 is provided for the purpose of preventing linear movement of the guide with respect to the elbow in response to pressure applied against roller surface 41 by the electrical wire 58 as it is pulled in either direction through the elbow. The stop means is shown as comprised of a slide 60 having an adjusting slot 62 and a thumbscrew 64, the threaded shaft 66 of which is threaded into support 34 such that when loosened, slide 60 can be moved to a position such that it will abut a portion of the elbow such as the inner surface 68 of end 20. Tightening of thumbscrew 64 will then insure that the guide will not move and cause misalignment of roller surface 41 and aperture 26. A very satisfactory variation of the stop means is provided by constructing the guide of such dimensions that a portion thereof such as the base 32 or the supports 34 and 36 are sufficiently long to bear against a portion of the elbow such as inner surface 68 or 69 when the roller surface 41 and aperture 26 are in registry.

In a preferred embodiment of the invention, base 32 of the guide and floor 22 of the elbow are in substantial contact during pulling of the wire. This feature assists in maintaining a more solid placement of the guide in the elbow cavity and helps to prevent wobbling and dislocation of the guide from is operative position wherein the roller surface 41 and aperture 26 are properly aligned. It is noted that in order to assure contact of the said floor and base, the supports 34 and 36 must be high enough to clear the upper edges of the elbow walls 14 and 16. Otherwise, a vertical tipping action of the guide can occur in response to downward force on the roller.

The dimensions of the guide may, of course, be varied to provide the above features for any size elbow. Moreover, the exact shape of the elbow is immaterial as long as it is designed to have a floor, side walls, and a substantially right angle wire passage. Likewise, the shape of the guide portions may be varied without departing from the present invention. For example, the base 32 may have a concave or convex lateral surface and may be oblong, and the roller 40 may actually be in the form of a pulley wheel.

Figure 4:
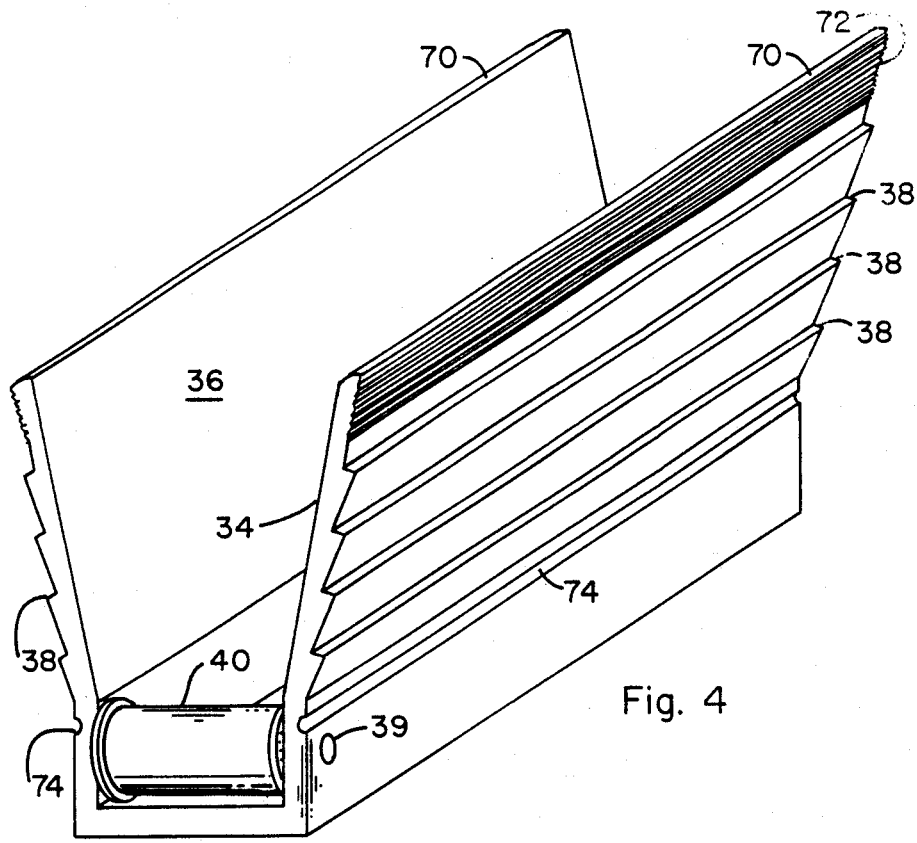
FIG. 4 is an isometric view of a variation of the guide.
Figure 5:
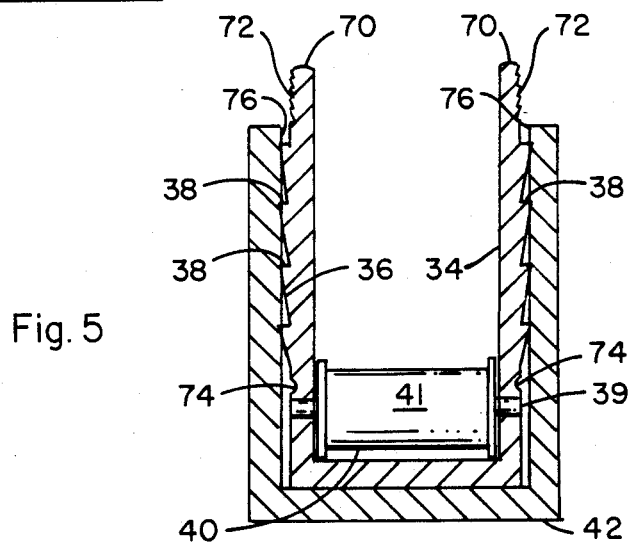
FIG. 5 is an end view, partially in section, of the guide of FIG. 4.

Referring to FIGS. 4 and 5, the guide is shown to comprise basically a variation in the clamping mechanism. The clamp means 38, in this embodiment, constitutes actual gripping teeth, of any number, extending preferably, but not necessarily, the full length of the support means 34 and 36 and adapted to frictionally engage, actually bite into, the inner surfaces of the elbow cavity walls. In this embodiment, the outer edge portions 70 of supports 34 and 36 are preferably provided with finger gripping ridges 72 such that removal of the guide from the elbow can be readily accomplished by compressing the supports toward each other to release teeth 38. In this regard, at least one of the supports must be dimensioned such that its upper outer surface having the gripping teeth will flex inwardly as the guide is forced down into the elbow cavity to its position shown in FIG. 5. For this purpose, hinge grooves 74 may be provided, especially when the guide material is polyvinyl chloride, Nylon, or other such polymer. It is particularly noted that where it is desired to employ rigid, hard metal for the guide, various types of hinges, both plastic and mechanical can be provided to give the necessary compressibility to the supports.

With further reference to FIG. 5, the elbow walls are shown provided with a small inner ridge 76 at their outer edges. Such elbow construction is often employed and provides an assist for teeth 38.

Referring to FIGS. 6 through 16, where the same or equivalent structure to that shown in FIGS. 1-5 is numbered the same, the embodiments of FIGS. 6–11 are designed for pulling wires through the sides of elbows of the types shown in FIGS. 16 and 17. These guides are either left handed or right handed, and are essentially mirror images of each other. In these guides a single clamp means 38 is employed. The rollers means 40 are only shown in FIGS. 8, 9, 11, 13, 16, and 17. Referring specifically to FIG. 9, a significant structural feature is shown in the bevel 78 given to the lower roller bearing member 80 of support means 34. This bevel allows the guide to be more easily pulled out of the elbow as it allows the pulled wire, typically under some tension, to ride or slip over the outer edge of member 80 which normally serves to retain the wire in the area of the working surface 41 of the roller.

The embodiment of FIGS. 12-14 is similar to that of FIGS. 4 and 5, except that the clamp means consists the frictional force generated by the outward expansive tendency of supports 34 and 36 against the elbow walls, as supplemented by the force exerted on the roller by the wire being pulled thereagainst.

The invention has been described in detail with particular reference to preferred embodiments thereof, but it will be understood that variations and modifications will be effected within the spirit and scope of the invention.

I claim:

1. A wire pulling guide for use with an electrical conduit elbow fitting having the elements of opposed side walls, opposed end walls and a floor, said walls and floor forming a generally rectangular elbow cavity, said fitting further having a plurality of connector apertures through said elements communicating with said cavity, said guide comprising a body having a substantially flat, rectangular base, support means in the form of a wall extending upwardly from each longitudinal edge of said base in a generally vertical direction to provide a longitudinally extending access gap extending from the top of said support means to said base, roller means mounted on said support means and extending between the walls thereof substantially parallel to said base and in close proximity thereto, and clamp means on said support means for frictionally enaging the side walls of said elbow fitting, said body being adapted for positioning in said elbow cavity with said floor and said base in contact and with portions of the working surface of said roller means substantially tangentially aligned with at least two of said connector apertures, and with said clamp means frictionally engaging the side walls of said elbow fitting for maintaining the operative position of said guide in said elbow cavity.

2. The guide of claim 1 wherein said elbow fitting has a first connector aperture through said floor adjacent one end thereof, and a second connector aperture through the end wall adjacent the other end of said floor, said body being adapted for positioning in said elbow cavity with portions of said working surface of said roller means substantially tangentially aligned with said first and second connector apertures.

3. The guide of claim 1 wherein said roller means comprises a cylindrical member rotatably mounted on a shaft secured to the walls of said support means and extending therebetween, and wherein the ends of said cylindrical member are in close proximity to said walls.

4. The guide of claim 21 wherein each of said walls of said support means is flared outwardly at its upper portions relative to the respective longitudinal edge of said base from which it extends.

5. The guide of claim 4 wherein the outwardly flared upper portions of said walls are adapted to frictionally engage the upper edges of the opposed side walls of said elbow fitting as the guide is pushed into said elbow cavity.

6. The guide of claim 5 wherein shoulder means are provided on said upper portions of said walls for increasing the frictional contact with said elbow fitting walls.

7. The guide of claim 5 wherein said walls of said support means are substantially rectangular and the vertical dimensions thereof are greater than the depth of said elbow cavity to provide finger grips for compressing the upper portions of said support walls for removing the guide from said cavity.

8. A device for forming and maintaining corner bends in electrical wiring comprising a wire pulling guide mounted in an electrical conduit elbow fitting having the elements of opposed side walls, opposed end walls and a floor, said walls and floor forming a generally rectangular elbow cavity, said fitting further having a plurality of connector apertures through said elements communicating with said cavity, said guide comprising a body having a substantially flat, rectangular base, support means in the form of a wall extending upwardly from each longitudinal edge of said base in a generally vertical direction to provide a longitudinally extending access gap extending from the top of said support means to said base, roller means mounted on said support means and extending between the walls thereof substantially parallel to said base and in close proximity thereto, and clamp means on said support means frictionally engaging the side walls of said elbow fitting, said body being positioned in said elbow cavity with said floor and said base in contact and with portions of the working surface of said roller means substantially tangentially aligned with at least two of said connector apertures.

9. The guide of claim 8 wherein said elbow fitting has a first connector aperture through said floor adjacent one and thereof, and a second connector aperture through the end wall adjacent the other end of said floor, said body being adapted for positioning in said elbow cavity with portions of said working surface of said roller means substantially tangentially aligned with said first and second connector apertures.

10. The guide of claim 8 wherein said roller means comprises a cylindrical member rotatably mounted on a shaft secured to the walls of said support means and extending therebetween, and wherein the ends of said cylindrical member are in close proximity to said walls.

11. The guide of claim 8 wherein each of said walls of said support means is flared outwardly at its upper portions relative to the respective longitudinal edge of said base from which it extends.

12. The device of claim 11 wherein the outwardly flared upper portions of said walls are adapted to frictionally engage the upper edges of the opposed side walls of said elbow fitting as the guide is pushed into said elbow cavity.

13. The guide of claim 12 wherein shoulder means are provided on said upper portions of said walls for increasing the frictional contact with said elbow fitting walls.

14. The guide of claim 12 wherein said walls of said support means are substantially rectangular and the vertical dimensions thereof are greater than the depth of said elbow cavity to provide finger grips for compressing the upper portions of said support walls for removing the guide from said cavity.

* * * * *